Jan. 19, 1960   A. J. STEFANO   2,921,386
UNIVERSAL WORLD TIME AND STAR MAP
Filed Aug. 6, 1957   2 Sheets-Sheet 1

INVENTOR
Anthony J. Stefano

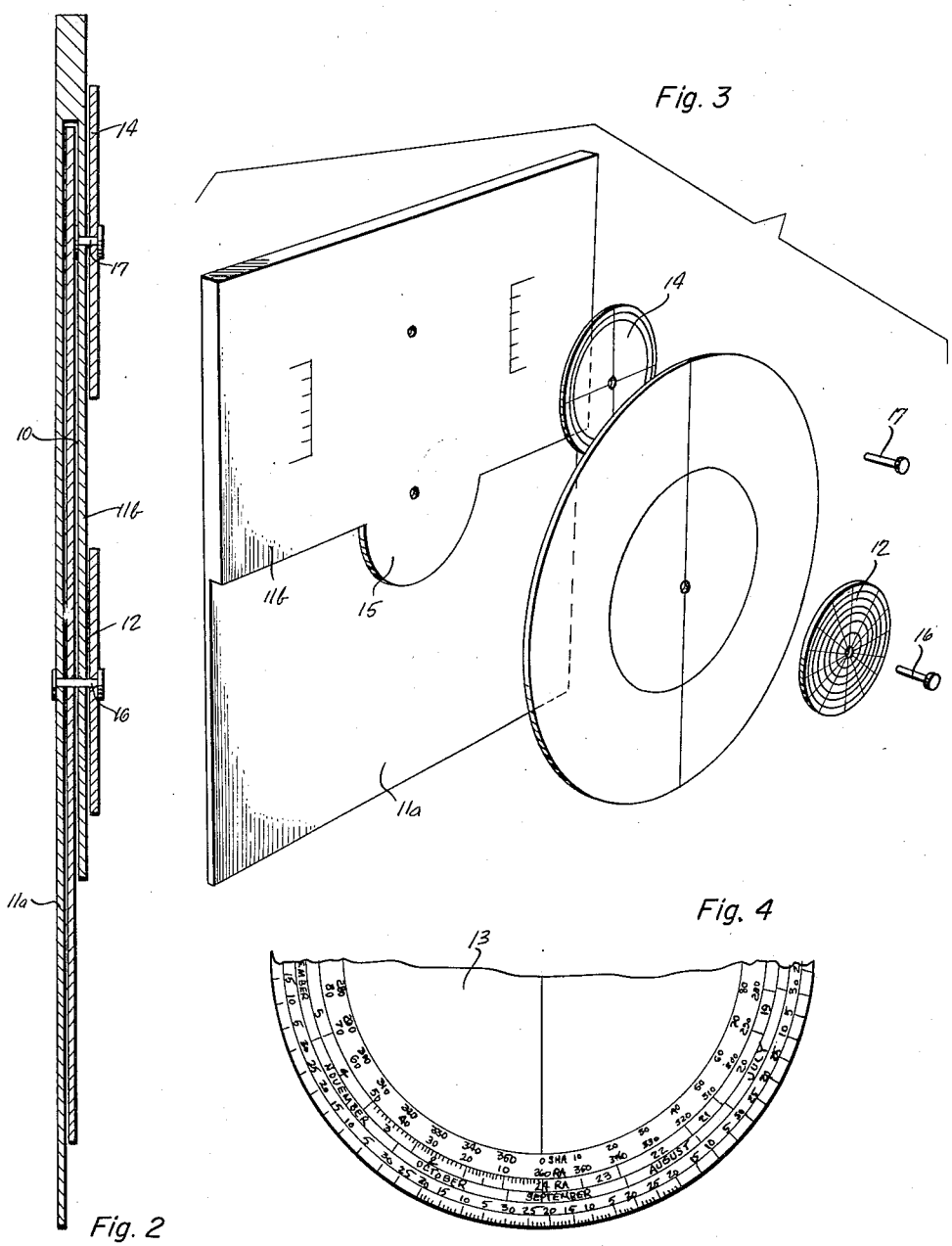

United States Patent Office 2,921,386
Patented Jan. 19, 1960

2,921,386
UNIVERSAL WORLD TIME AND STAR MAP

Anthony J. Stefano, San Diego, Calif.

Application August 6, 1957, Serial No. 676,608

1 Claim. (Cl. 35—44)

This invention relates to scientific instruments and more particularly to the geographical and astronomical sciences.

It is an object of the present invention to provide a geographical and astronomical instrument having means for determining the day of the month and the exact time at any place in the world.

It is another object of the present invention to provide an astronomical map of the world defined into terms of latitude and longitude for determining a particular position as a point of reference for determining the time and date at any other place throughout the world.

A still further object of the present invention is to provide an instrument of the above type wherein a plurality of rotatably mounted discs cooperate with each other to define maps and scales for determining the desired information.

Other objects of the invention are to provide a world time and star map bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 2 is a side elevational view of the device shown in Figure 1;

Figure 3 is an exploded perspective view showing the manner in which the discs and scales are positioned with respect to each other; and Figure 4 is an enlarged fragmentary view of one of the discs forming a part of the present invention, showing the details thereof.

Figure 1:
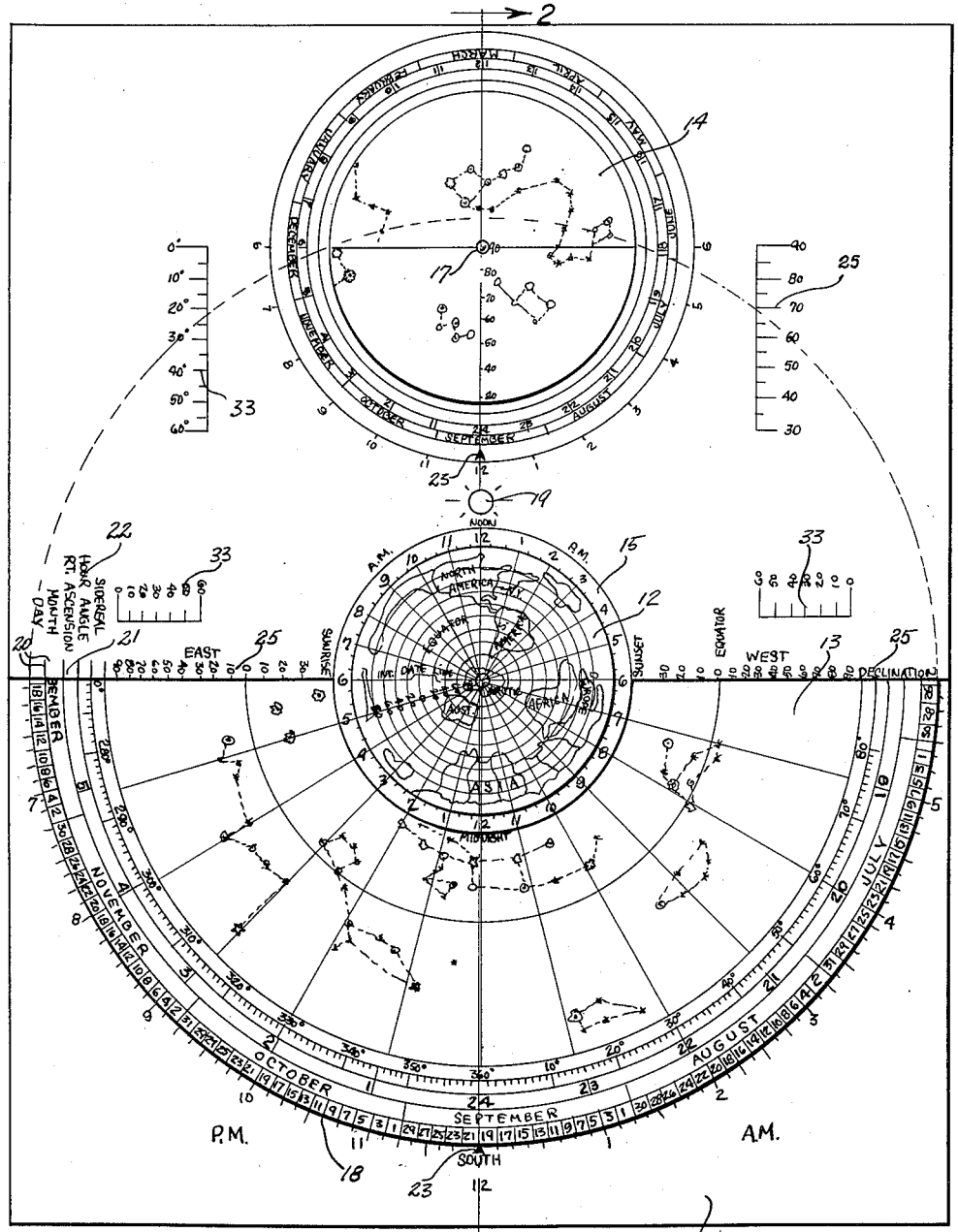
Figure 1 is a top plan view of a world time and star map made in accordance with the present invention.

Referring now more in detail to the drawing, a universal world time and star map made in accordance with the present invention is shown to include a South Polar map 12 of the world that is superimposed upon a time ring 15 and a star disc 13. The world map 12 and star disc 13 are rotatably secured to the base plate 11 by means of a pin or eyelet 16. The time ring 15 actually forms a depending part of the base plate 11 as more clearly shown in Figure 3. The small star disc 14 is the central part of the main star disc 13 that is covered by the world map 12 and time ring 15. The star disc 14 is also movable and is secured to the fixed plate 11 by the eyelet 17, as clearly shown in Figure 2. The base plate 11 includes a lower portion 11a and an upper portion 11b that define a space therebetween in the form of a pocket 10 that rotatably receives the disc 13. Thus, the depending disc 15 defines a semi-circular mask that overlies the disc 13.

By revolving a specific location on the world map 12 to the current clock time designated by the time ring 15, it is possible to determine the time and day of all of the places of the world simultaneously. For example, it is possible to determine the time and date in Sydney, Australia, from a location in New York by merely revolving the world map 12 to the present time in New York; for example 1:00 p.m. The time in Sydney would thus be 4:00 a.m. the following day or a total of fifteen hours difference in time.

The star maps 13 and 14 may be used in two different positions. In the universal position, the current month and day shown on the date scale 20 on the star maps 13 and 14 are rotated until they coincide with the arrow markers 23 at the bottom of the star maps on the fixed plate so that the apparent relationship of the stars and constellations and the sun 19 may be visualized with respect to the earth. By rotating the corresponding designated location on the world map 12 to the present time on the time ring 15, the stars and constellations, together with the sun, may be visualized in their proper relationship with respect to the earth in the night sky. Both day and night are shown in their proper relation. The earth's shadow is placed at the broad angle indicated to show the stars that are visible between the hours indicated during the late fall and winter months when the nights are longer.

The horizon to horizon position is another position in which the star maps may be used. To view the stars and constellations from horizon to horizon in any locality at any given month, date, and hour between 6:00 p.m. and 6:00 a.m., the location desired may be revolved on world map 12 to midnight on the time ring 15, and the star discs 13 and 14 rotated until the desired month and day are shown thereon, on date scales 20, coincide with the desired clock time on the 6:00 p.m. to 6:00 a.m. time scales 18 on the lower half of the star discs 13 and 14. Time scales 18 are printed on the fixed plate 11. Thus it is now possible to view the stars and constellation in the sky as they assume their proper relation to the horizon by holding the plate overhead facing downward with north, east, south, and west, in their respective positions. The right ascension scale 21 and siderial hour angle scale 22 on the star disc 13, and latitude and/or declination scale 25 on the plate 11 also form useful scales for enhancing the accuracy of the present invention.

This device may also be used to accurately locate the longitude and latitude of any desired point by using the map as a guide and viewing the stars on the meridian. Thus, the universal world time and star map is provided that is extremely simple in construction, extremely accurate in use, and which may be used for various purposes and at any desired location. The device is also conveniently provided with horizon limit scales 33.

This device may very easily and readily be assembled and disassembled, as may be required, as clearly shown in Figure 3. The pure simplicity of the parts and the accuracy of the scales makes this a very desirable instrument for the purposes intended.

While various changes may be made in the detail construction, it shall be understood that such changes shall be within the spirit and scope of the present invention as defined by the appended claim.

What I claim as new and desire to protect by Letters Patent of the United States is:

A universal world time and star map comprising a base plate having a lower portion and an upper portion spaced above the lower portion and defining a pocket therebetween, said upper portion having a diametrically-extending edge with a semi-circular mask depending therefrom and concentric with the center thereof, said upper portion and semi-circular mask having a time ring area thereon extending about and from the periphery of the semi-circular mask, a large star disc disposed in said pocket and having its center aligned with the center of the semi-circular mask, a small world map disc overlying the upper portion concentric with the large disc and having its center aligned therewith, means extending through the centers of the base and discs to rotatably support the discs upon the base, said small disc being of less diameter than the time ring area and lying therewithin, said upper portion of the base by its diametrically-extending edge defining the momentary night areas of the discs, said discs having radial lines to facilitate their alignment with time ring and the diametrically-extending edge of the upper portion.

References Cited in the file of this patent

UNITED STATES PATENTS

| | | |
|---|---|---|
| 2,397,002 | Hagner | Mar. 19, 1946 |
| 2,533,535 | Tellier | Dec. 12, 1950 |
| 2,755,565 | Alkema | July 24, 1956 |

FOREIGN PATENTS

| | | |
|---|---|---|
| 320,169 | Great Britain | Oct. 10, 1929 |